United States Patent [19]

Warner

[11] 3,890,047
[45] June 17, 1975

[54] DIFFERENTIAL LASER GYRO EMPLOYING REFLECTION POLARIZATION ANISOTROPY

[75] Inventor: Richard T. Warner, Winsted, Conn.
[73] Assignee: United Aircraft Corporation, East Hartford, Conn.
[22] Filed: Feb. 25, 1969
[21] Appl. No.: 802,014

[52] U.S. Cl. ......... 356/106 LR; 331/94.5; 332/7.51
[51] Int. Cl. ............................................. H01s 3/10
[58] Field of Search ............ 356/106 RL; 332/7.51; 331/94.5

[56] References Cited
UNITED STATES PATENTS
3,373,650   3/1968   Killpatrick ......................... 356/106

Primary Examiner—Malcolm F. Hubler
Assistant Examiner—N. Moskowitz
Attorney, Agent, or Firm—M. P. Williams

[57] ABSTRACT

The polarization anisotropy which is utilized together with directional anisotropy so as to form a differential laser gyro system having two laser gyros operating in the same cavity with cavity modes of different frequencies in the form of mutually perpendicular plane polarization in each of the clockwise and counterclockwise directions, is achieved by providing a cavity having an odd number of dielectric mirrors and a total path length adjusted so that the phase reversal of one plane polarized wave (eg, vertical) results in a frequency difference between it and the other (eg, horizontal) polarized wave. The directional anisotropy may suitably be provided by a Faraday cell disposed in the optical path between quarter wave plates.

1 Claim, 5 Drawing Figures

INVENTOR
RICHARD T. WARNER

Melvin Pearson Williams
BY  ATTORNEY

DIFFERENTIAL LASER GYRO EMPLOYING REFLECTION POLARIZATION ANISOTROPY

BACKGROUND OF THE INVENTION

1. Field of the Invention

This invention relates to laser gyros and more particularly to a differential laser gyro in which phase reversals at the mirrors provide polarization anisotropy necessary to achieve, with directional anisotropy, polarization eigenstates at four separate frequencies.

2. Description of the Prior Art

Ring-type lasers, employing electromagnetic traveling waves at the optical or near optical frequencies in a clockwise and counterclockwise direction about a closed path in a principal plane, have been utilized to sense rates of angular rotation, similar in function to the well-known electromechanical gyro. The rotation of the laser requires more time for a traveling wave to complete the optical path in the direction of rotation, and requires less time for a traveling wave to complete the optical path in a direction opposite to the direction of rotation. Thus, if a laser is rotating in the same direction as the clockwise beam, the frequency of the clockwise beam will appear to be less than the natural frequency of the laser, whereas the frequency of the counterclockwise beam will seem to be higher. The difference between the two frequencies is a function of the rate of rotation of the gyro.

A problem encountered in the prior art is that the two beams tend to mode lock; that is, for very low differences between the two frequencies, the two waves interfere with one another and each assumes a frequency which is identical to the other. In fact, one of the two traveling waves, by virtue of intrinsic or momentary lower loss (greater gain), may achieve dominance, and by depletion of the gain population, extinguishes the other traveling wave. This effectively results in a deadband for low angular rates of the gyro.

These problems have been overcome in a differential laser gyro system described in a copending application of the same assignee entitled DIFFERENTIAL LASER GYRO SYSTEM, Ser. No. 763,277, filed on Sept. 27, 1968 by G. B. Yntema, D. C. Grant, Jr. and R. T. Warner. In said differential laser gyro system, two laser gyros are operated on the same optical path within the same optical cavity. Each of the gyros is effectively isolated from the other by a frequency separation which is caused by a polarization anisotropy, each gyro operating with electromagnetic radiation having a polarization (either plane or circular) which is orthogonal to the equivalent polarization of the electromagnetic radiation in the other gyro. The clockwise and counterclockwise waves in each gyro are also separated from one another by a directional anisotropy, which may conveniently be achieved by a Faraday cell. The frequency bias between the oppositely directed waves in each laser gyro prevents mode locking at low angular rates; however, the bias for each gyro is accommodated in the overall, two gyro system, by subtracting the frequency difference between the waves in one gyro from the frequency difference between the waves in the other gyro, so that the biases cancel each other and form no part of the indicated output. Thus, the differential laser gyro in said copending application has accommodated low angular rates with a frequency bias, without the problems attendant biased laser gyros known to the prior art.

The polarization anisotropy within the differential laser gyro of said copending application is achieved by means of an optically active or birefringent material which may be provided separately of the Faraday cell, or may be combined with a magnetic field producing means so as to provide both anisotropies within a single element. Said differential laser gyro may employ quarter wave plates so that the radiation throughout the substantial length of the cavity is plane polarized, and is circularly polarized only within the Faraday cell, or it may be implemented so as to utilize circular polarization throughout the length of the optical path. However, the polarization anisotropy is equivalent whether it be provided in plane polarized light of perpendicular orientation by means of a birefringent material, or circularly polarized light of opposite helicity by means of an optically active material.

SUMMARY OF THE INVENTION

The object of the present invention is to provide a differential laser gyro system having an alternative means for providing polarization anisotropy.

According to the present invention, two laser gyros operating in the same optical path within the same optical cavity are implemented with electromagnetic radiation of mutually perpendicular plane polarization, in an optical path including an odd number of mirrors. In accordance further with the present invention, the length of the optical path is so chosen, with respect to the source of electromagnetic radiation, that the phase reversal at each mirror of the radiation in the vertically polarized gyro is equivalent to a frequency shift between the gyros which effectively isolates them from one another so as to avoid perturbation.

As used herein, the terms "vertical" and "horizontal" mean with respect to the plane of incidence of radiation upon a mirror within the differential laser gyro, assuming for simplicity that the plane of incidence is horizontal, though in practice it could be at any orientation. The plane of incidence is defined as a plane which includes the propagative vector of incident light (and therefore reflected light) and a normal to the planar surface of the mirror errected at the point at which the ray impinges in the mirror surface. In the embodiment of a single axis component of a differential laser gyro system described herein, the plane of incidence is also the plane of the differential laser gyro system.

The foregoing and other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
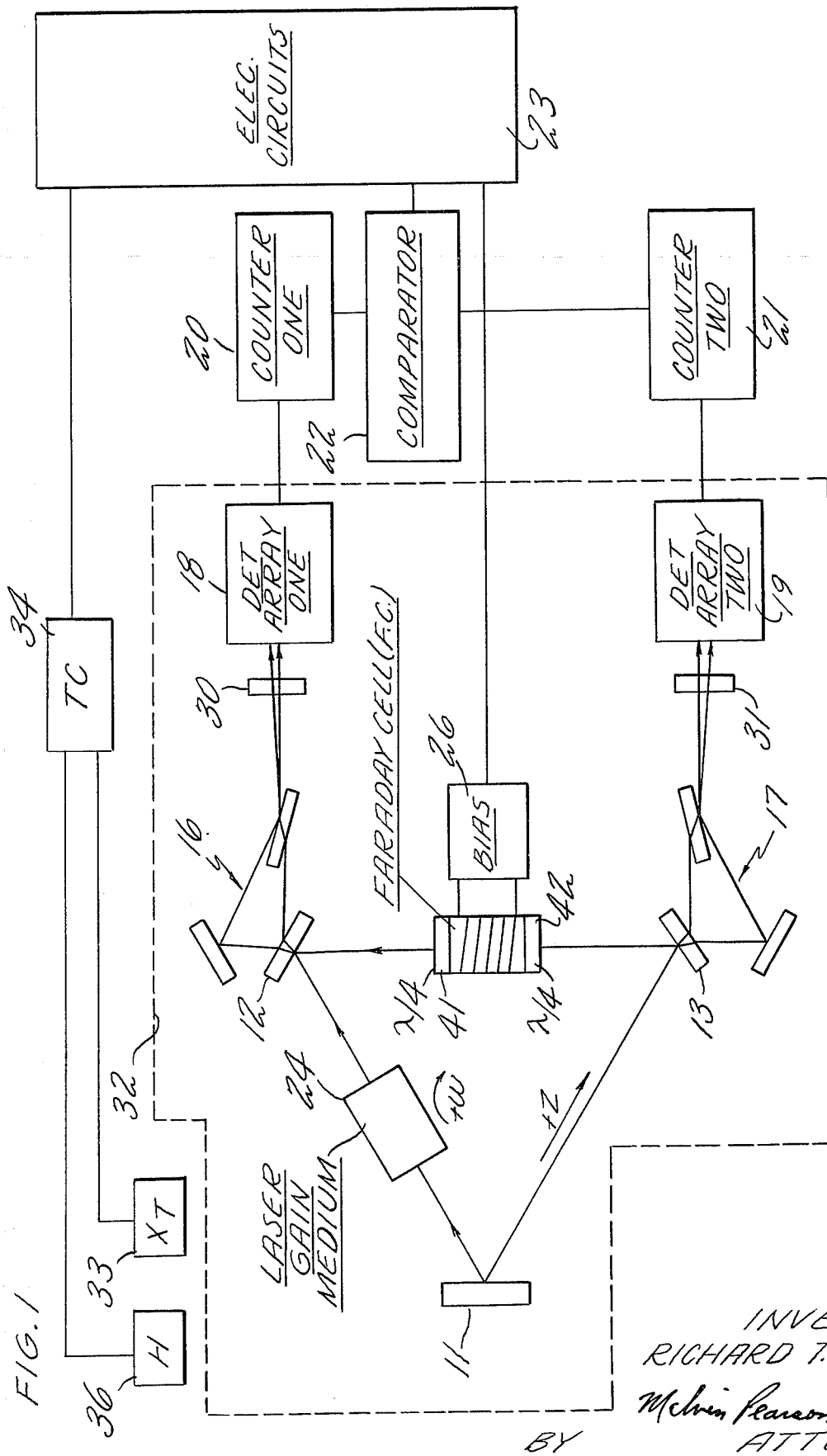
FIG. 1 is a simplified schematic diagram of a laser gyro system according to the present invention.

A detailed explanation of the principal of operation of the differential laser gyro, in which two laser gyros are caused to operate on the same optical path of the same optical cavity, the two gyros being isolated from one another by being of different polarizations and at different frequencies, each gyro having its clockwise and counterclockwise waves biased to slightly different frequencies by a directional anisotropy, is given in the aforementioned copending application, which is incorporated herein by reference. In said application, the preferred embodiment illustrated provides separation of the frequencies of the two different laser gyros so as to isolate the two gyros from each other by means of a polarization anisotropy which comprises a quartz crystal or other birefringent or optically active element. As described therein, the quartz crystal will provide a frequency difference for electromagnetic radiation of mutually perpendicular plane polarization, or for electromagnetic radiation which is circularly polarized in two different directions of helicity. The present invention relates to a different means to provide polarization anisotropy, but is operative only when the radiation that is incident upon the mirror of the optical cavity is plane polarized, and the direction of polarization in each laser gyro is perpendicular to the direction of polarization of the other laser gyro and the polarization plane of one laser gyro is parallel, whereas the polarization plane of the other laser gyro is perpendicular to the plane of incidence of the mirror, and each of them impinge upon the mirror as an incidence angle which is less than Brewster's angle. The following description of a laser gyro system incorporating the present invention, as illustrated in FIG. 1, employs the same reference numerals as the description of the system illustrated in FIG. 1 and described in said copending application.

Referring now to FIG. 1, one embodiment of a single axis component of laser gyro system in accordance with the present invention comprises a ring laser having three mirrors 11–13, the mirrors 12 and 13 being partially reflecting so as to allow light to pass therethrough to related optical systems 16, 17 for direction light into corresponding photosensing apparatus or detecting arrays 18, 19, the output of which operates electronic detection counters 20, 21 of the type well known in the prior art. The mirrors 11–13 may be of any known type, but may preferably comprise dielectric mirrors. The outputs of the counters 20, 21 are summed in a comparator 22, which in turn feeds electronic gyro circuitry 23.

The laser shown in FIG. 1 is provided with a laser gain medium 24, which may be controlled by the circuits 23. Disposed within the optical path of the gyro is a directional anisotropic optical element, such as a Faraday cell 25 (FC), which may be supplied electric current by a bias power supply 26 to produce a magnetic field parallel to the optical path, under control of the circuits 23. Alternatively, the Faraday cell may be provided the magnetic field of a permanent magnet. The Faraday cell causes the clockwise traveling wave of light energy in the cell to pass therethrough at a different speed than the counterclockwise traveling wave of the same circular polarization, whereby the frequencies of the clockwise and counterclockwise waves are separated. Quarter-wave plates 41, 42 are disposed on opposite sides of the directional anisotropy so that the four traveling waves within the ring laser of FIG. 1 will comprise both clockwise and counterclockwise waves of mutually perpendicular plane polarization except along the part of the optical path where the traveling waves pass through the Faraday cell 25.

The optic systems 16, 17 each include a polarized filter 30, 31. The filter 30 passes horizontally polarized light and blocks vertically polarized light, and the filter 31 passes vertically polarized light and blocks horizontally polarized light. Thus, the respective pairs of beams of the two laser gyros in a gyro system of the present invention are separately applied to corresponding counters 20, 21. Thus, the elements 16, 30, 18 and 20 comprise portions of a first gyro and the elements 17, 31, 19 and 21 comprise elements of a second gyro.

A gyro system in accordance with the present invention is preferably provided with a shield 32 to significantly reduce interference by the earth's magnetic field (and other stray fields). Additionally, the shield may provide a low-gradient thermal path to assist in temperature control of the gyro system. A temperature transducer (XT) 33 may be suitably disposed to accurately detect a mean temperature of the gyro system, the output thereof feeding a temperature control circuit (TC) 34, which may also be controlled by the electronic circuits 23. The temperature control 34 in turn will provide suitable control over a heater element (H) 36 which may preferably deliver heat to the shielding 32 so as to uniformly distribute heat, as necessary, to the laser gyro system, thereby to maintain its temperature constant. Maintaining the temperature of the gyro substantially constant will control the length of the ring laser cavity about the mirrors 11–13, and therefore holds the isotropic cavity frequency to close tolerances.

As illustrated in FIG. 1, the Faraday cell 25 may comprise any material with a suitable Verdet constant which is provided with a suitable magnetic field. The directional anisotropy of the Faraday cell is provided by the magnetic field in the said material. For instance, the material may be fused quartz or even glass if properly chosen.

The gyro system of this invention may readily be implemented in solid quartz, as is known in the art, or through other known techniques.

Figure 2:
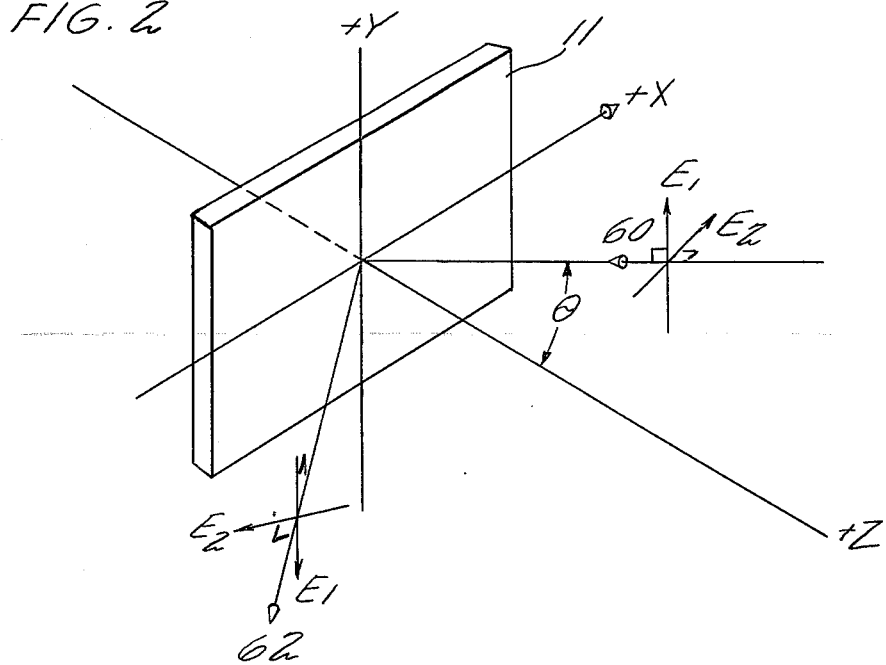
FIG. 2 is a schematic illustration of the relationship between the physical and electrical characteristics obtaining at a mirror.

As an aid in understanding the operation of the present invention, it should be understood that the present invention relates to the provision of polarization anisotropy, and is implemented by utilizing the phase reversal which occurs in the electric field of electromagnetic radiation which is perpendicular to the plane of incidence, as a result of reflection from a mirror, for an incidence angle which is less than Brewster's angle, such as a dielectric mirror. Referring to FIG. 2, the mirror 11 is taken as an example. The mirror is planar, and is illustrated in FIG. 2, as in a vertical plane defined by the coordinates X and Y. The normal (N) to the mirror is in the plus Z direction. As an example, an electromagnetic wave traveling in a counterclockwise direction is illustrated by the vector 60 as being incident upon the mirror 11 at an angle of incidence theta within the plane of incidence (which is defined in FIG. 2 by the X and Z corrdinates). The plane of incidence, as is well known, is a plane defined by the vector of the incident radiation and the normal of the planar mirror surface at the point of incidence. The reflective radiation vector 62 is also in the plane of incidence. As illustrated in FIG. 2, the incident beam 60 includes an electromagnetic field E2 which is time variant in the plane of incidence and an electromagnetic field E1 which is time variant in a plane perpendicular to the plane of incidence. Assuming that a positive direction of phase is outward for E2 and upward for E1, there is no phase reversal of the E2 electric field since the summation of fields caused by incident and reflected waves is zero at the point of incidence upon the surface of the mirror (regardless of the instantaneous fields of either of them); this is because the fields are naturally of an opposite sense at the incidence with the plane of the mirror. On the other hand, in order for the total electric field to be zero at the mirror surface (as required by the well know Maxwellian postulate) the reflected wave must have a vertical electric field which is of opposite sense to the vertical electric field of the incident wave. Thus, there is a phase reversal of pi radians, or 180°, in the vertical electric field between the incident and the reflected waves.

Figure 3:
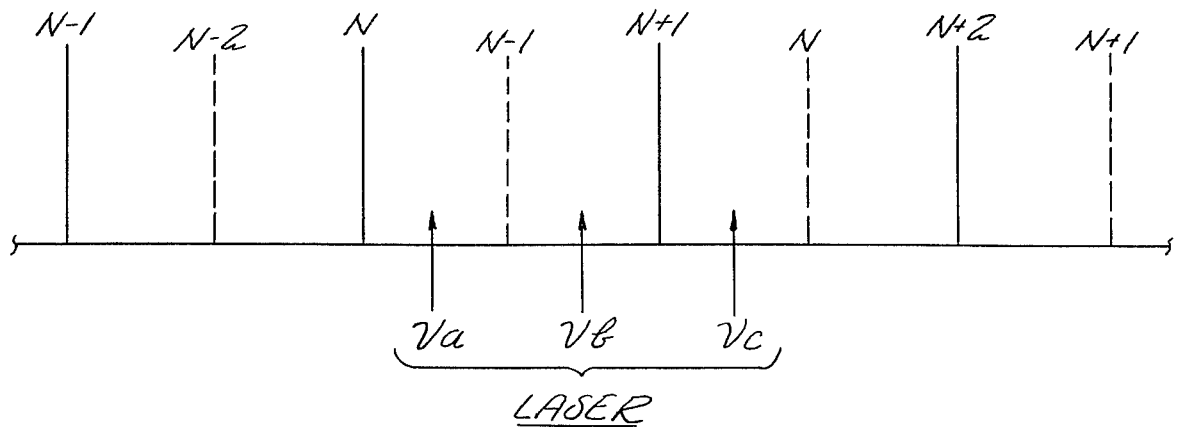
FIG. 3 is a schematic illustration of possible numbers of wavelengths as a function of frequency for two waves of mutually perpendicular polarization in a laser gyro incorporating the present invention.

This is the phenomenon upon which the present invention is based. Since a phase shift of pi radians is equivalent to one half wavelength, the effect of the phase shift is as though the vertically polarized radiation has to travel one half wavelength farther or one half wavelength less in order to achieve a given phase. Thus, in a system having an odd number of mirrors greater than one (such as the three mirrored system shown in FIG. 1) the length of the total optical path between and including all the mirrors is effectively different for the vertically polarized light and for the horizontally polarized light. This is illustrated in FIG. 3 wherein the solid vertical lines illustrate frequencies of horizontally polarized radiation and the dashed vertical lines illustrate frequencies of vertically polarized radiation at which a whole number of wavelengths are contained in a hypothetical given length of optical path of the ring laser. For purposes of illustration, FIG. 3 is based on the assumption that the phase reversal amounts to an increase in phase, and that therefore a greater number of wavelengths can be obtained within a given optical path than would be true without such a phase shift. It also assumes the three mirror system illustrated in FIG. 1. Thus, the vertically polarized wave is three halves of a wavelength displaced from the horizontally polarized wave in terms of that frequency of electromagnetic radiation which can be sustained with a whole number of wavelengths about the path. Therefore, for a given length of optical path, and operating with a laser gain medium of a determinable transition frequency, the vertically polarized wave will be at a slightly different frequency than the horizontally polarized wave, thereby giving rise to the frequency isolation between two different laser gyros operating on the same optical path within the same optical cavity, which is the objective of the present invention.

Figure 4:
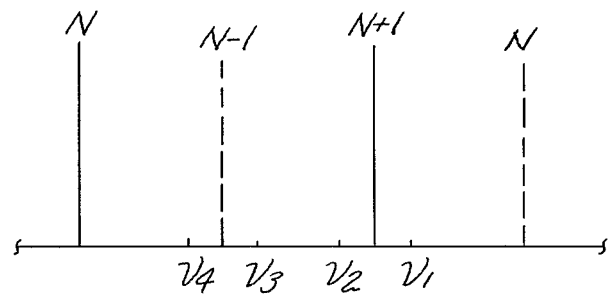
FIG. 4 is a schematic illustration of possible wavelengths and actual frequencies which obtain, including the frequency biasing effect of a directional anisotropy, in a laser gyro system incorporating the present invention.

For example, consider laser gain mediums having any one of three different frequencies $va$, $vb$, $vc$. If a laser gain medium having a line frequency of $v$ a were chosen, then the frequencies of operation would be such that the horizontal wave would have $n$ wavelengths and the vertical wave would have $n-1$ wavelengths about the path. If a laser medium having a frequency $vb$ were chosen, then frequencies of oscillation for the vertically polarized wave would have $n+1$ wavelengths about the path whereas the horizontally polarized wave would still have $n-1$ wavelengths about the path. Further, if a laser gain medium having a line frequency of $vc$ were chosen, then the horizontal wave would similarly have $n+1$ wavelengths about the path whereas the vertical wave would have $n$ wavelengths about the path. As described hereinbefore, FIG. 3 ignores the directional anisotropy provided by the Faraday cell. When the Faraday cell is included in considerations, then the vertically and horizontally polarized waves in each of two different directions are all at different frequencies, as illustrated in FIG. 4. As described hereinbefore, this is because the Faraday cell has a different propagation characteristic in one direction than in the other so that the counterclockwise waves and the clockwise waves are separated in frequency. Thus, assuming (FIG. 3) that a laser gain medium having a line frequency $vb$ is chosen, the counterclockwise wave (assuming a suitably oriented Faraday cell) of the horizontally polarized laser gyro will operate at a frequency $v1$, and a clockwise wave of the horizontally polarized laser gyro will operate at a frequency $v2$. Similarly, the clockwise wave of the vertically polarized laser gyro will operate at a frequency $v3$, and the counterclockwise wave of the vertically polarized gyro will operate at a frequency $v4$.

Figure 5:
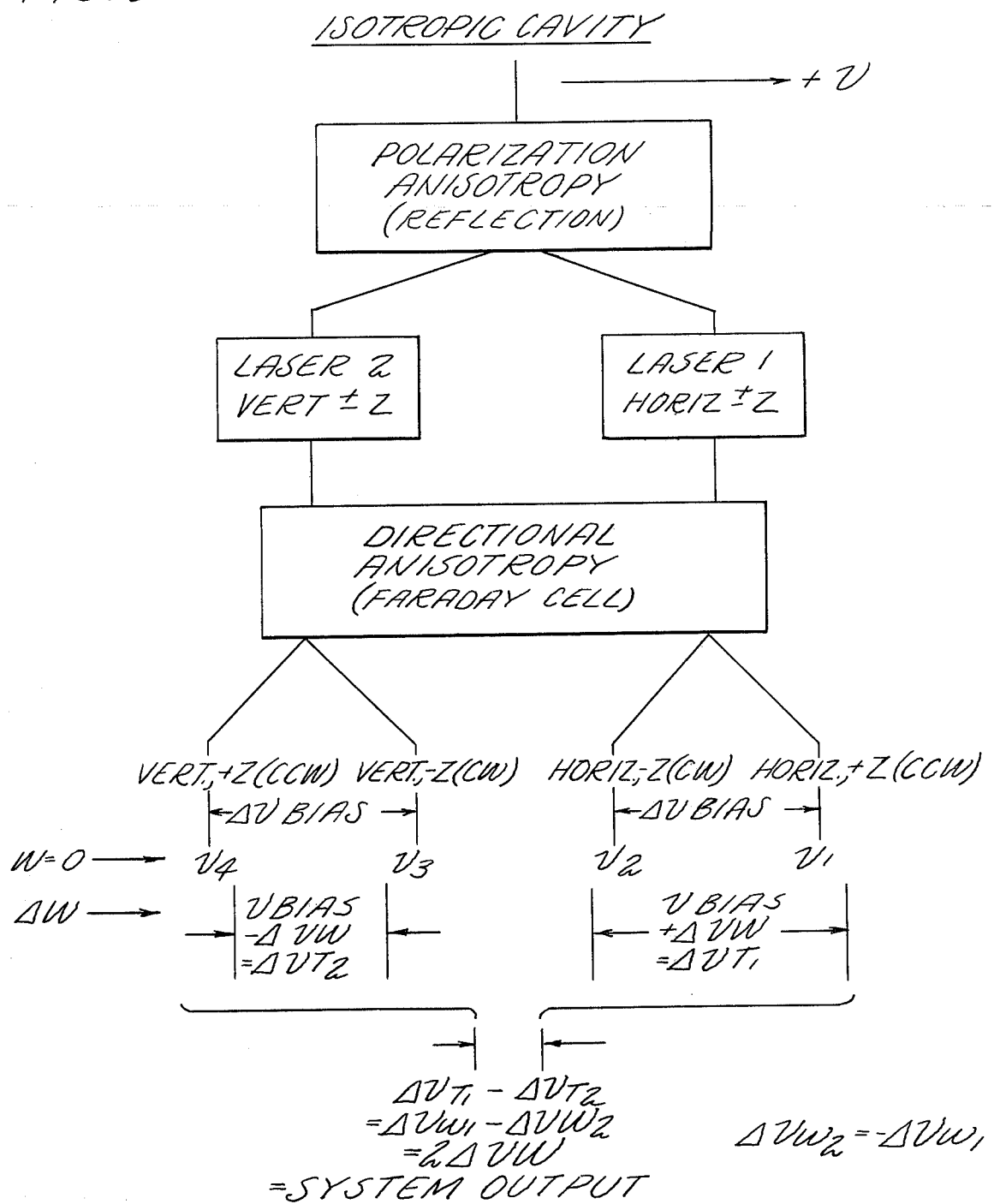
FIG. 5 is a diagramatic chart illustrating the basic principal of the present invention.

The system aspects of a laser gyro system in accordance with the present invention, and described thus far with respect to FIGS. 1–4, are illustrated in the chart of FIG. 5. In the chart of FIG. 5, the effects of a rotation $w$ are illustrated; this rotation $w$ is in the clockwise direction as illustrated in FIG. 1. The +Z direction is shown in FIG. 1 to be counterclockwise. If one considers starting at an isotropic (or average) cavity frequency (top of FIG. 5), then two lasers are created by the polarization anisotropy caused by the mirror phase shift of the vertically polarized traveling wave. Thus, laser ONE is implemented with horizontally polarized light in both the +Z and −Z direction and laser TWO is implemented with vertically polarized light in both the +Z and −Z directions. Biasing for both lasers is achieved by the single directional anisotropy of the Faraday cell 24. This results in laser ONE having horizontally polarized light in the +Z direction and horizontally polarized in the −Z direction, at two different frequencies which are a function of the bias provided by the Faraday cell 24. Similarly, laser TWO has vertically polarized light in the −Z direction, and vertically polarized light in the +Z direction, the difference between the two frequencies being a function of the same bias provided by the same Faraday cell as for gyro ONE. Thus, if the rotation $w$ is equal to zero, the two frequencies of the horizontally polarized laser are separated by an amount nearly equal to the amount by which the two frequencies of the vertically polarized laser are separated. Upon the introduction of an angular rotation, for instance $+w$, to the laser gyro, the frequencies of the four traveling waves change. Those traveling waves which are in the same direction as the angular rotation $+w$ will have a lower frequency, and those traveling waves which are in the opposite direction will have a higher frequency. Thus, the traveling waves in the −Z direction (at frequencies $v2$ and $v3$), are lower, whereas the waves traveling in the +Z direction ($v1$, $v4$) become higher in frequency. Since the cavity frequency and the parameters of the polarization and directional anisotropic elements are chosen so as to give the frequency arrangements illustrated in FIG. 5, it can be seen that the total frequency difference between the two traveling waves of the vertically polarized laser (laser TWO) come closer together in frequency, whereas the two traveling waves of the horizontally polarized laser (laser ONE) become separated by a higher frequency. This results in the differential action required for a differential laser gyro system. Obviously, the output of the two separate laser gyros may be subtracted, one from the other, so as to provide an output equal to their difference, which is twice the frequency change effect in either one of them as described more fully in the aforementioned copending application.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A differential laser gyro system comprising a ring laser optical cavity having an optical path including an odd number of mirrors and a laser gain medium disposed in said cavity;

a Faraday cell disposed in said optical path;

a pair of quarter wave plates disposed on opposite ends of said Faraday cell, said quarter wave plates and said Faraday cell comprising an optical path segment wholly between two of said mirrors, whereby the traveling waves incident upon each of said mirrors from either direction is plane polarized in mutually perpendicular planes;

the length of said optical cavity being chosen with respect to the line frequency of said laser gain medium so as to provide a cavity length including an integral number of wavelengths within the oscillation-sustaining frequency range of said laser gain medium in said optical cavity, whereby the frequency of electromagnetic radiation in one orientation of plane polarization differs from the frequency of electromagnetic radiation in a perpendicular sense of polarization, the parameters of said laser gyro system being chosen so that there is provided a pair of laser gyros operating in said cavity separated in frequency, each implemented in a polarization which is distinct from the other, each having a bias which is opposite to but substantially equal in magnitude to the bias of the other; and differential read out means for providing an output proportional to the difference between outputs of the two laser gyros.

* * * * *